US010855879B2

(12) United States Patent
Park et al.

(10) Patent No.: US 10,855,879 B2
(45) Date of Patent: Dec. 1, 2020

(54) METHOD FOR ESTABLISHING WIRELESS CONNECTION OF IMAGE FORMING DEVICE BY USING MOBILE TERMINAL, AND IMAGE FORMING DEVICE FOR PERFORMING SAME

(71) Applicant: HEWLETT-PACKARD DEVELOPMENT COMPANY, L.P., Spring, TX (US)

(72) Inventors: Hyun-Wook Park, Suwon-si (KR); SungJoon Park, Suwon-si (KR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/393,160

(22) Filed: Apr. 24, 2019

(65) Prior Publication Data

US 2019/0253582 A1 Aug. 15, 2019

Related U.S. Application Data

(63) Continuation of application No. PCT/KR2017/007004, filed on Jul. 3, 2017.

(30) Foreign Application Priority Data

Nov. 25, 2016 (KR) .................. 10-2016-0158496

(51) Int. Cl.
H04W 76/00 (2018.01)
H04W 88/08 (2009.01)
(Continued)

(52) U.S. Cl.
CPC ......... H04N 1/333 (2013.01); H04N 1/00307 (2013.01); H04W 48/08 (2013.01);
(Continued)

(58) Field of Classification Search
CPC ... H04N 1/333; H04N 1/00307; H04W 76/14; H04W 84/12; H04W 88/08; H04W 88/02; H04W 48/08; G06B 5/223
See application file for complete search history.

(56) References Cited

U.S. PATENT DOCUMENTS 9,907,016 B2 * 2/2018 Shibata ................ H04W 48/18
9,998,535 B2 * 6/2018 Liu .................... H04L 29/08072
(Continued)

FOREIGN PATENT DOCUMENTS

CN 105230117 A 1/2016
CN 105848191 A 8/2016
(Continued)

Primary Examiner — Juan M Guillermety
(74) Attorney, Agent, or Firm — Jefferson IP Law, LLP

(57) ABSTRACT

A wireless connection establishment method of an image forming apparatus using a mobile terminal is provided. The wireless connection establishment method includes, while the image forming apparatus is operating in a wireless fidelity (Wi-Fi) Direct mode, receiving a request to switch to a wireless setup mode, terminating the Wi-Fi Direct mode and connecting to a mobile terminal by entering the wireless setup mode, receiving access point (AP) connection information from the mobile terminal, establishing a connection to an AP by using the received AP connection information, and starting the Wi-Fi Direct mode.

15 Claims, 11 Drawing Sheets

(51) Int. Cl.
*H04W 84/12* (2009.01)
*H04N 1/00* (2006.01)
*H04N 1/333* (2006.01)
*H04W 76/14* (2018.01)
*H04W 88/02* (2009.01)
*H04W 48/08* (2009.01)

(52) U.S. Cl.
CPC ........... *H04W 76/14* (2018.02); *H04W 88/02* (2013.01); *H04W 84/12* (2013.01); *H04W 88/08* (2013.01)

(56) References Cited

U.S. PATENT DOCUMENTS

| | | | | |
|---|---|---|---|---|
| 2012/0252412 | A1* | 10/2012 | Kimura | H04W 12/06 455/411 |
| 2013/0148162 | A1* | 6/2013 | Park | G06K 15/4005 358/1.15 |
| 2013/0252547 | A1 | 9/2013 | Cho et al. | |
| 2014/0078971 | A1* | 3/2014 | Bontu | H04W 8/005 370/329 |
| 2014/0320908 | A1 | 10/2014 | Iwauchi et al. | |
| 2015/0093992 | A1* | 4/2015 | Tanaka | H04B 5/0031 455/41.2 |
| 2015/0289282 | A1* | 10/2015 | Phuyal | H04W 76/14 370/329 |
| 2015/0327005 | A1* | 11/2015 | Niwa | H04W 76/23 455/41.2 |
| 2016/0127938 | A1 | 5/2016 | Yoon et al. | |
| 2016/0361678 | A1* | 12/2016 | Blackley | G01N 33/0036 |
| 2017/0094451 | A1* | 3/2017 | Terashita | H04W 4/06 |

FOREIGN PATENT DOCUMENTS

| | | |
|---|---|---|
| KR | 10-2013-0013238 A | 2/2013 |
| KR | 10-2013-0080487 A | 7/2013 |
| KR | 10-2016-0050830 A | 5/2016 |
| WO | WO-2015093906 A1 | 6/2015 |
| WO | WO-2015/119394 A1 | 8/2015 |
| WO | WO-2015119394 A1 | 8/2015 |

* cited by examiner

METHOD FOR ESTABLISHING WIRELESS CONNECTION OF IMAGE FORMING DEVICE BY USING MOBILE TERMINAL, AND IMAGE FORMING DEVICE FOR PERFORMING SAME

BACKGROUND ART

Information such as a password is required to connect a device capable of wireless communication to a wireless access point (AP). Accordingly, a user may input information required for connection to the AP via an input/output interface of the device to be connected to the AP and may request connection to the AP.

An input/output interface included in an image forming apparatus may have poor manipulability and convenience. Accordingly, a method may be used in which, when a mobile terminal such as a smartphone or a tablet personal computer (PC) is connected to the image forming apparatus and a user inputs information required for AP connection via the connected mobile terminal, the mobile terminal transmits the information to the image forming apparatus and the image forming apparatus is connected to the AP by using the received information.

BRIEF DESCRIPTION OF DRAWINGS

The above and other aspects, features, and advantages of certain examples of the disclosure will be more apparent from the following description taken in conjunction with the accompanying drawings, in which.

Throughout the drawings, it should be noted that like reference numbers are used to depict the same or similar elements, features, parts, components, and structures.

DETAILED DESCRIPTION

Figure 1:
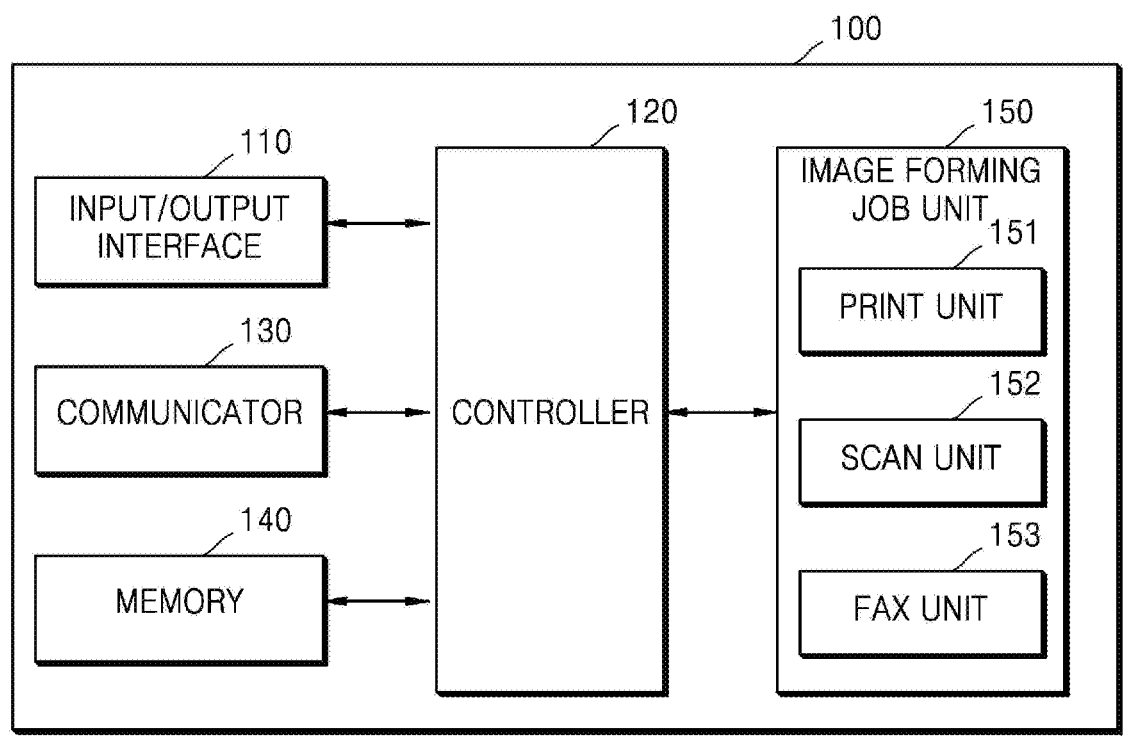
FIG. 1 is a diagram illustrating an image forming apparatus, according to an example.

Various examples will now be described more fully with reference to the accompanying drawings. The examples set forth herein may have different forms. To more clearly describe features of the examples, description of details that are well-known to one of ordinary skill in the art is omitted.

When an element is referred to as being "connected" to another element, the element may not only be "directly connected thereto" but also be "connected thereto with an intervening element therebetween". In addition, when an element is referred to as "including" another element, unless otherwise described, the element may further include another element rather than exclude the other element.

"An image forming job" may denote various operations related to an image (e.g. printing, copying, scanning, or faxing), such as formation of an image or generation/storage/transmission of an image file, and "a job" may denote not only an image forming job but also a series of processes required to perform an image forming job.

An "image forming apparatus" may denote any type of apparatus capable of performing an image forming job, such as a printer, a copier, a scanner, a fax machine, a multi-function printer (MFP), or a display apparatus.

"A hard copy" may denote an operation of outputting an image on a printing medium such as paper, and "a soft copy" may denote an operation of outputting an image on a display apparatus such as a television (TV) or a monitor, or on a memory.

"Content" may denote any type of data, such as a picture, an image, a document file, etc. on which an image forming job is to be performed.

"Print data" may denote data converted to a format printable by a printer.

"A scan file" may denote a file generated by scanning an image via a scanner.

"A user" may denote a person who performs an operation related to an image forming job by using an image forming apparatus or by using a device connected to an image forming apparatus in a wired or wireless fashion. "An administrator" may denote a person who has the authority to access all functions and a system of an image forming apparatus. "An administrator" and "a user" may denote the same person.

Hereinafter, examples of a method of connecting an image forming apparatus to a wireless access point (AP) by using a mobile terminal will be described. According to the examples set forth herein, when a mobile terminal is wirelessly connected to an image forming apparatus and receives information required for connection to an AP from a user, the mobile terminal transmits the information required for connection to an AP to the image forming apparatus. The image forming apparatus establishes a connection to an AP by using the received information. In this regard, the image forming apparatus is assumed to support Wi-Fi Direct, and the mobile terminal may support Wi-Fi Direct or may not support Wi-Fi Direct.

Before various examples are described, a basic structure of an image forming apparatus will be described with reference to FIG. 1, and a structure of connecting an image forming apparatus to an external apparatus such as a mobile terminal and a server will be described with reference to FIG. 2. In addition, a software configuration of an image forming apparatus supporting Wi-Fi Direct will be described with reference to FIG. 3. Additional examples will be described with reference to FIGS. 4 to 11.

FIG. 1 is a diagram illustrating a structure of an image forming apparatus, according to an example.

Referring to FIG. 1, an image forming apparatus 100 may include an input/output interface 110, a controller 120, a communicator 130, a memory 140, and an image forming job unit 150. Although not illustrated, the image forming apparatus 100 may further include a power unit for supplying power to each element.

The input/output interface 110 may include an input interface for receiving an input for performing an image forming job from a user and an output interface for displaying information such as a performance result of an image forming job or a state of the image forming apparatus 100. For example, the input/output interface 110 may include an operation panel for receiving a user input and a display panel for displaying a screen.

The input interface may include, for example, an apparatus capable of receiving various user inputs such as a keyboard, a physical button, a touchscreen, a camera, a microphone, etc. In addition, the output interface may include, for example, a display panel, a speaker, etc. However, the disclosure is not limited thereto, and the input/output interface 110 may include an apparatus supporting various inputs and outputs.

The controller 120 may control an operation of the image forming apparatus 100 and may include a processor such as a central processing unit (CPU). The controller 120 may control other elements included in the image forming apparatus 100 to perform an operation corresponding to a user input received via the input/output interface 110.

For example, the controller 120 may execute a program stored in the memory 140, may read a file stored in the memory 140, or may store a new file in the memory 140.

In the examples below, the controller 120 performs control for switching between a Wi-Fi Direct mode and a wireless setup mode, turning on and off Soft AP, and establishing a connection to an AP.

The communicator 130 may perform wired or wireless communication with another device or a network. To this end, the communicator 130 may include a communication module (e.g., a transceiver) supporting at least one of various wired and wireless communication methods. For example, the communication module may be in the form of a chipset or may be a sticker/barcode (e.g., a sticker including a near-field communication (NFC) tag) including information required for communication.

Wireless communication may include, for example, at least one of wireless fidelity (Wi-Fi), Wi-Fi Direct, Bluetooth, ultra-wideband (UWB), NFC, etc. Wired communication may include, for example, at least one of universal serial bus (USB), high definition multimedia interface (HDMI), etc. In the examples below, the image forming apparatus 100 is assumed to support Wi-Fi Direct.

The communicator 130 may be connected to an external apparatus outside the image forming apparatus 100 and thus may transmit and receive signals or data.

Figure 2:
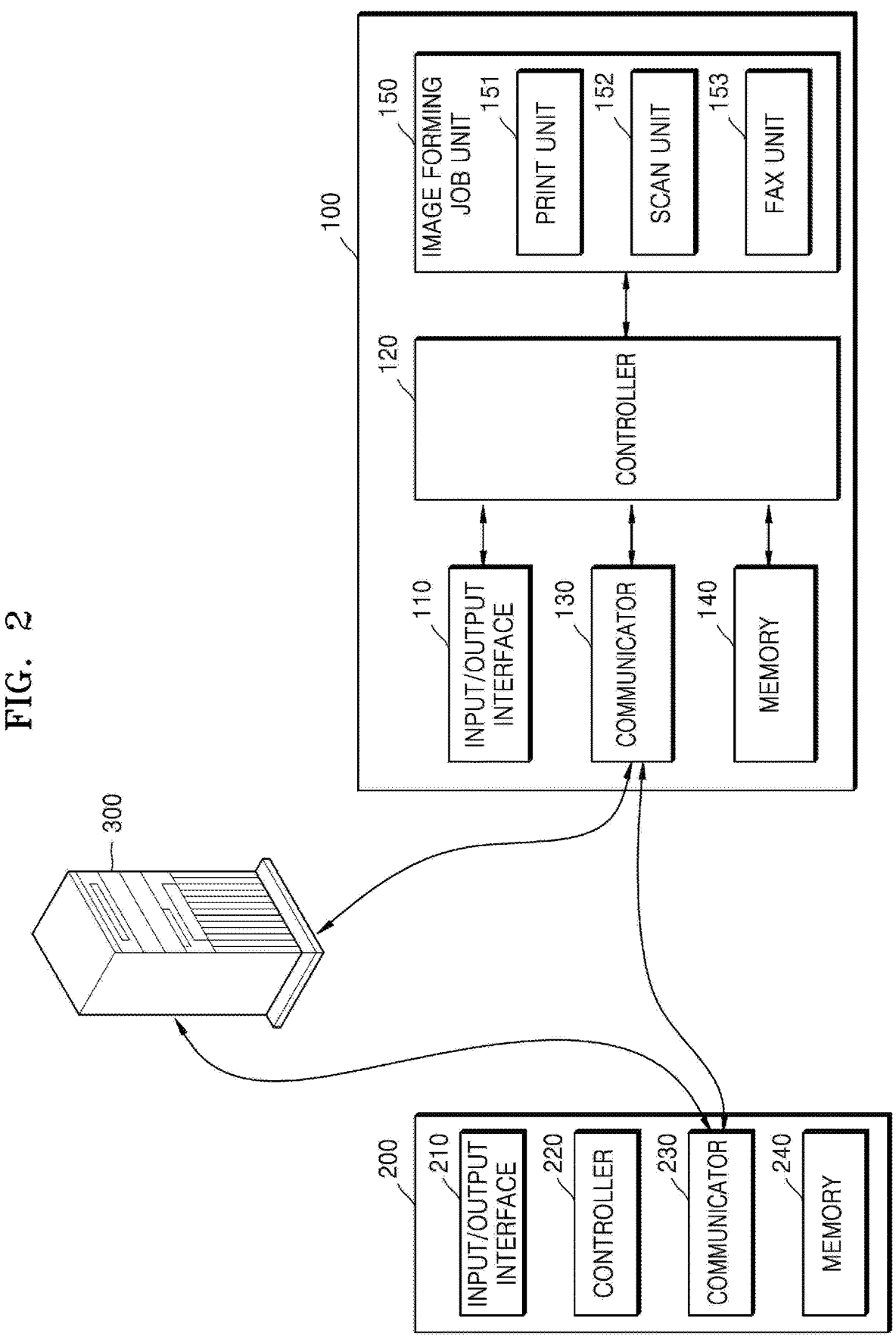
FIG. 2 is a diagram illustrating an environment in which an image forming apparatus is connected to a mobile terminal, according to an example.

FIG. 2 is a diagram illustrating an environment in which an image forming apparatus is connected to a mobile terminal, according to an example.

Referring to FIG. 2, the image forming apparatus 100 is connected to an external apparatus 200 via the communicator 130. The communicator 130 may transmit a signal or data received from the external apparatus 200 to the controller 120 or may transmit a signal or data generated in the controller 120 to the external apparatus 200. For example, when the communicator 130 receives a print command signal and print data from the external apparatus 200, the controller 120 may output the received print data via a printer unit 151.

As illustrated in FIG. 2, the external apparatus 200 may include an input/output interface 210, a controller 220, a communicator 230, and a memory 240. The controller 220 may execute a program stored in the memory 240 and may transmit a signal or data generated as a result to the image forming apparatus 100 via the communicator 230, thereby controlling an image forming job. The external apparatus 200 may include, for example, a smartphone, a tablet, a personal computer (PC), a home device, a medical device, a camera, a wearable apparatus, etc. In the examples below, a case in which the external apparatus 200 is a mobile terminal will be described. In the examples below, the external apparatus 200 may support or may not support Wi-Fi Direct.

The communicator 130 may be directly connected to a server 300 and thus may transmit and receive signals or data. In addition, the communicator 130 may be connected to the external apparatus 200 via the server 300. That is, the communicator 130 of the image forming apparatus 100 may transmit and receive signals or data to and from the communicator 230 of the external apparatus 200 via the server 300.

Returning again to FIG. 1, various types of data such as a program such as an application and a file may be installed and stored in the memory 140. The controller 120 may access and use data stored in the memory 140 or may store new data in the memory 140. In addition, the controller 120 may execute a program installed in the memory 140. In addition, the controller 120 may install an application externally received via the communicator 130 in the memory 140.

The image forming job unit 150 may perform an image forming job such as printing, copying, scanning, or faxing.

Although FIG. 1 illustrates the image forming job unit 150 including the print unit 151, a scan unit 152, and a fax unit 153, if necessary, the image forming job unit 150 may include only some of the above elements or may further include an element for performing another image forming job.

The print unit 151 may form an image on a recording medium through various printing methods such as an electrophotographic method, an inkjet method, a thermal transfer method, a thermal sensitive method, etc.

The scan unit 152 may irradiate light onto a document and may read an image recorded on the document by receiving reflected light. As an image sensor for reading an image from a document, for example, a charge coupled device (CCD), a contact type image sensor (CIS), or the like may be used. The scan unit 152 may have a flatbed structure in which a document is located at a fixed position and an image is read as an image sensor moves, a document feed structure in which an image sensor is located at a fixed position and a document is fed, or a combined structure thereof.

The fax unit 153 may share an element for scanning an image with the scan unit 152, may share an element for printing a received file with the print unit 151, and may transmit a scan file to a destination or may externally receive a file.

Figure 3:
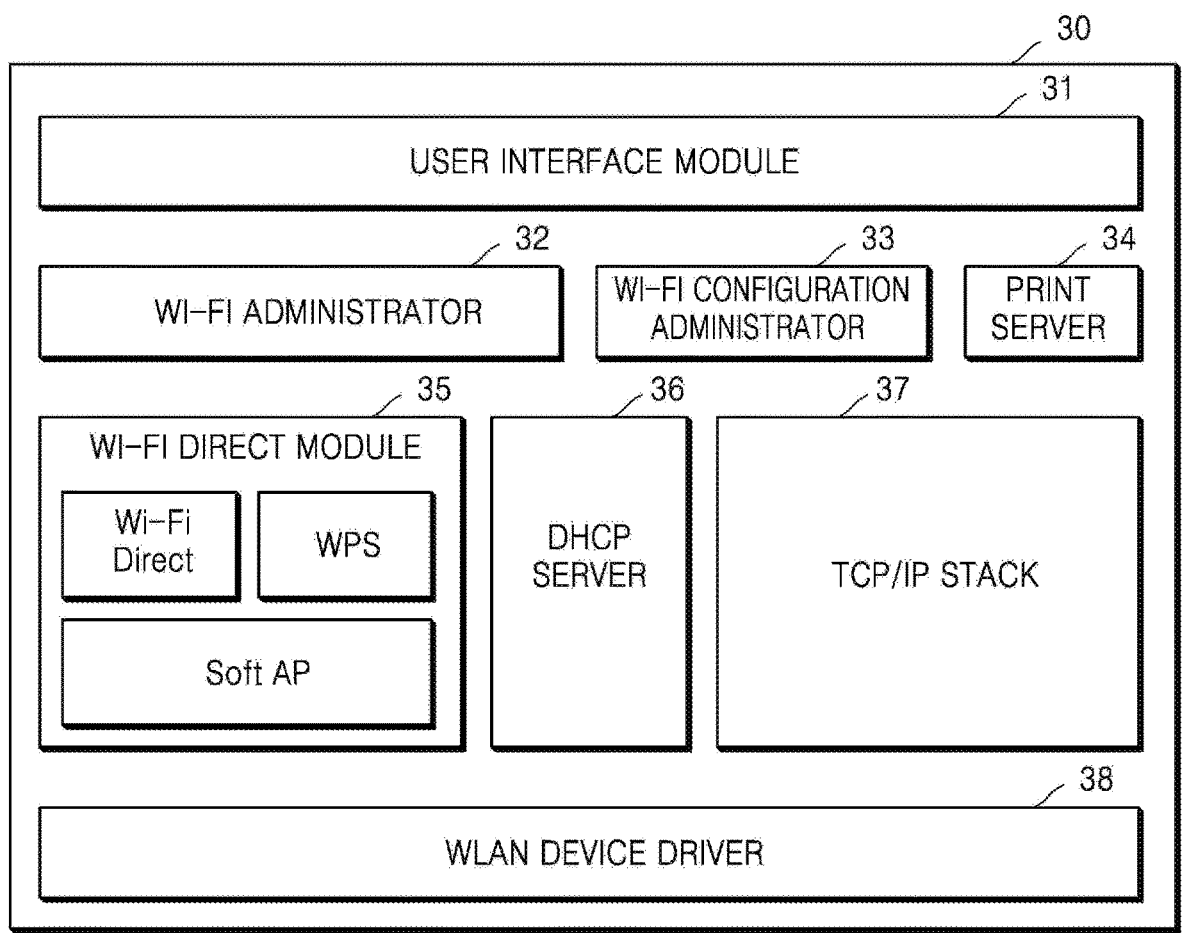
FIG. 3 is a diagram illustrating a software configuration of an image forming apparatus, according to an example.

FIG. 3 is a diagram illustrating a software configuration of an image forming apparatus, according to an example.

Referring to FIG. 3, a software block 30 of an image forming apparatus according to an example includes modules such as a user interface 31, a Wi-Fi administrator 32, a Wi-Fi configuration administrator 33, a print server 34, a Wi-Fi Direct module 35, a dynamic host configuration protocol (DHCP) server 36, a transmission control protocol/Internet protocol (TCP/IP) stack 37, and a wireless local area network (WLAN) device driver 38.

The user interface 31 is a module for receiving a user's input, and in the example below, the user may select entry from a Wi-Fi Direct mode to a wireless setup mode via the user interface 31.

The Wi-Fi administrator 32 is a module for changing or managing a Wi-Fi mode of an image forming apparatus or performing connection to an AP.

The Wi-Fi configuration administrator 33 is a module for storing Wi-Fi related setting information of an image forming apparatus in a memory within the image forming apparatus and managing the information.

The print server 34 is a module for receiving and processing print data.

The Wi-Fi Direct module 35 includes Wi-Fi Direct, Wi-Fi protected setup (WPS), and Soft AP. Wi-Fi Direct is a module for performing a Wi-Fi Direct function and establishes and manages a Wi-Fi Direct connection with respect to a mobile terminal. WPS is a module for performing WPS during a Wi-Fi Direct connection process. Soft AP is a module that allows an image forming apparatus to serve as an AP, and when Wi-Fi Direct is activated in an image forming apparatus and the image forming apparatus becomes a group owner (GO), Soft AP is activated. Alternatively, even in a state in which Wi-Fi Direct is not activated in an image forming apparatus, only Soft AP may be activated. A wireless setup mode described in the examples below allows only Soft AP to be activated in a state in which Wi-Fi Direct is not activated in an image forming apparatus.

The DHCP server 36 is a module for generating and assigning an IP address to a mobile terminal connected to an image forming apparatus.

The TCP/IP stack 37 is a protocol stack for TCP/user datagram protocol (UDP)/IP communication within an operating system (OS) of an image forming apparatus. In the examples below, the image forming apparatus receives information required for connection to an AP from a mobile terminal via TCP/UDP/IP communication.

The WLAN device driver 38 is a low-level device driver for communicating with WLAN interface hardware.

Figure 4:
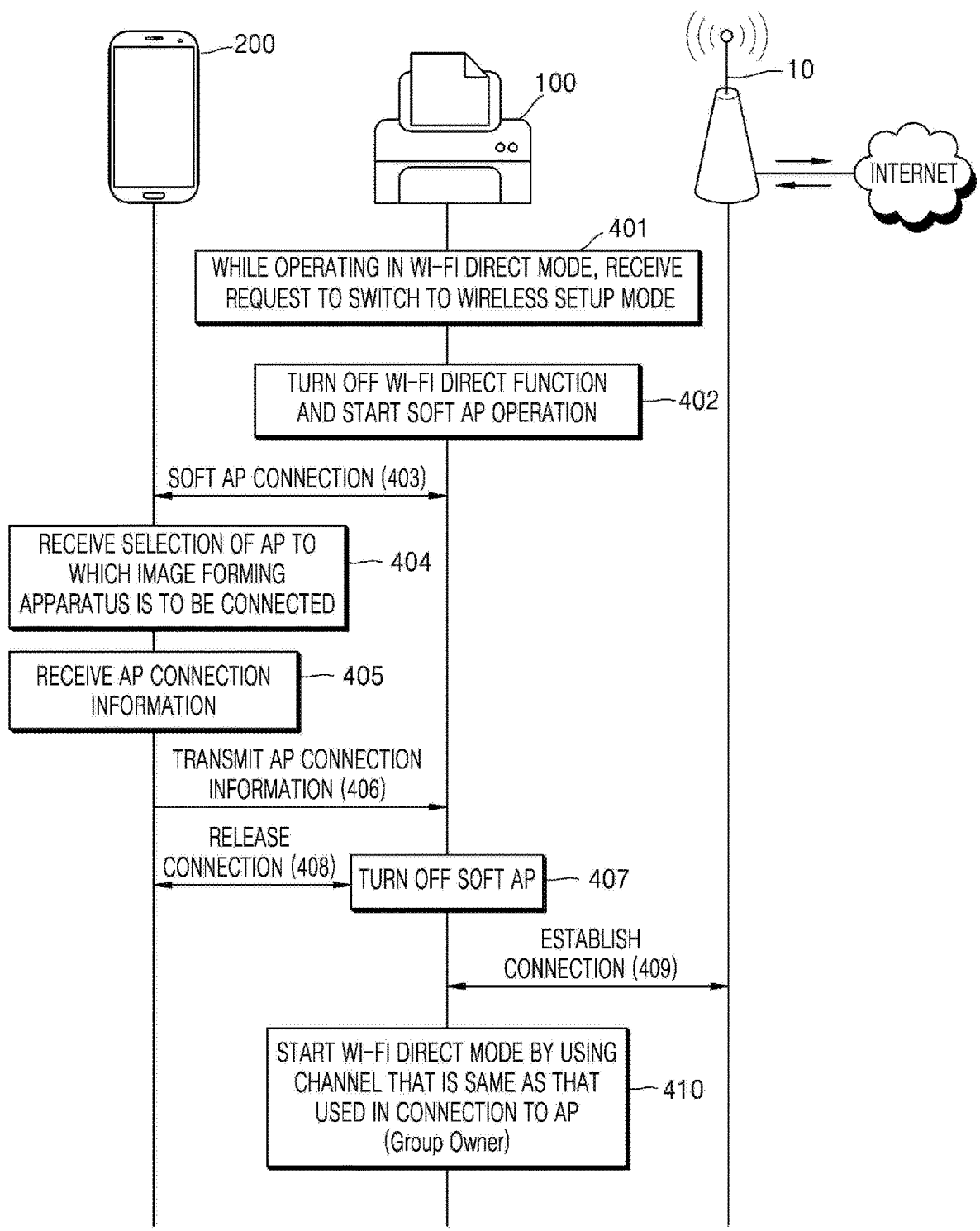
FIG. 4 is a diagram for explaining a method of connecting an image forming apparatus to an access point (AP) by using a mobile terminal, according to an example.

FIG. 4 is a diagram for explaining a method of connecting an image forming apparatus to an AP by using a mobile terminal, according to an example.

Referring to FIG. 4, a method of establishing a connection between the image forming apparatus 100 and an AP by wirelessly connecting the mobile terminal 200 not supporting Wi-Fi Direct to the image forming apparatus 100 is illustrated.

In operation 401, while the image forming apparatus 100 operates in a Wi-Fi Direct mode (serves as a GO), the image forming apparatus 100 receives a request to switch to a wireless setup mode from a user. In this regard, the wireless setup mode refers to a mode of operating only Soft AP after turning off the Wi-Fi Direct function. In operation 402, the image forming apparatus 100 enters the wireless setup mode by turning off the Wi-Fi Direct function and starting a Soft AP operation.

Once entering the wireless setup mode, the image forming apparatus 100 operates as follows.

When the image forming apparatus 100 operates as a GO of Wi-Fi Direct, a service set identifier (SSID) of the image forming apparatus 100 is generated according to standard rules of Wi-Fi Direct, and a change is made thereto. For example, when "DIRECT-xy-C1860 Series" is generated as an SSID of the image forming apparatus 100 while the image forming apparatus 100 operates in a Wi-Fi Direct mode, the SSID may be changed into "Vendor Printer Setup" when the image forming apparatus 100 enters a wireless setup mode.

In addition, the image forming apparatus 100 may stop an operation related to a Wi-Fi Direct function such as WPS and may allow only Soft AP to operate. Also, the image forming apparatus 100 may change a security mode, and may switch to a Soft AP mode to which security is not applied or a mode using a prefixed password.

When the image forming apparatus 100 completes entering a wireless setup mode, in operation 403, the mobile terminal 200 is wirelessly connected to Soft AP of the image forming apparatus 100.

When wireless connection between the mobile terminal 200 and the image forming apparatus 100 is completed, in operation 404, the mobile terminal 200 receives an input from the user of selecting an AP to which the image forming apparatus is to be connected. The user may search for connectable APs on the mobile terminal 200, and when found APs are displayed on a screen of the mobile terminal 200, the user may select, from among the found APs, an AP that is to be connected to the image forming apparatus 100.

When an AP 10 that is to be connected to the image forming apparatus 100 is selected, in operation 405, the mobile terminal 200 may receive an input of AP connection information from the user. The AP connection information is information required for connection to the AP 10 and may include, for example, credential information such as a password. Since the user inputs AP connection information via the mobile terminal 200 including a convenient input/output interface compared to the image forming apparatus 100, user convenience may be increased compared to a case in which AP connection information is directly input on the image forming apparatus 100.

In operation 406, the mobile terminal 200 transmits AP connection information received from the user to the image forming apparatus 100.

In operation 407, the image forming apparatus 100 turns off Soft AP, and, in operation 408, wireless connection between the image forming apparatus 100 and the mobile terminal 200 is released. The reason that the image forming apparatus 100 turns off Soft AP is to start connection to the AP 10. The image forming apparatus 100 may start connection to the AP 10 while Soft AP is on. However, since a channel that is used to connect the image forming apparatus 100 to the AP 10 is determined by the AP 10, a channel that is different from a channel that the image forming apparatus 100 has already been using in connection to the mobile terminal 200 is highly likely to be used in connection to the AP 10. Accordingly, the image forming apparatus 100 simultaneously uses two channels in wireless connection, which significantly decreases efficiency. To prevent this, connection to the mobile terminal 200 is released by turning off Soft AP before starting connection to the AP 10.

However, as described above, when connection between the image forming apparatus 100 and the mobile terminal 200 is released before connection to the AP 10 is attempted, the mobile terminal 200 may not receive a feedback regarding whether connection between the image forming apparatus 100 and the AP 10 has succeeded. Accordingly, examples below present a method in which the image forming apparatus 100 maintains a multi-channel during a certain time period.

In operation 409, the image forming apparatus 100 establishes a connection to the AP 10 by using the AP connection information received in operation 406. For example, the image forming apparatus 100 may request connection while transmitting a password received from the mobile terminal 200 to the AP 10, and the AP 10 having received the password may allow connection of the image forming apparatus 100 when authentication of the received password succeeds.

In operation 410, the image forming apparatus 100 switches from the wireless setup mode to the Wi-Fi Direct mode again, and in this regard, the image forming apparatus 100 starts the Wi-Fi Direct mode by using the same channel as that used in connection to the AP 10. In times of connection to the AP 10, the image forming apparatus 100 has to use a channel determined by the AP 10, whereas, when the image forming apparatus 100 operates as a GO of Wi-Fi Direct, the image forming apparatus 100 may select a channel that is to be used in wireless connection, and thus may start the Wi-Fi Direct mode with the channel used in the connection establishment of operation 409. In this regard, the image forming apparatus 100 may maintain connection to the AP 10 and at the same time may operate as a GO of Wi-Fi Direct.

Figure 5:
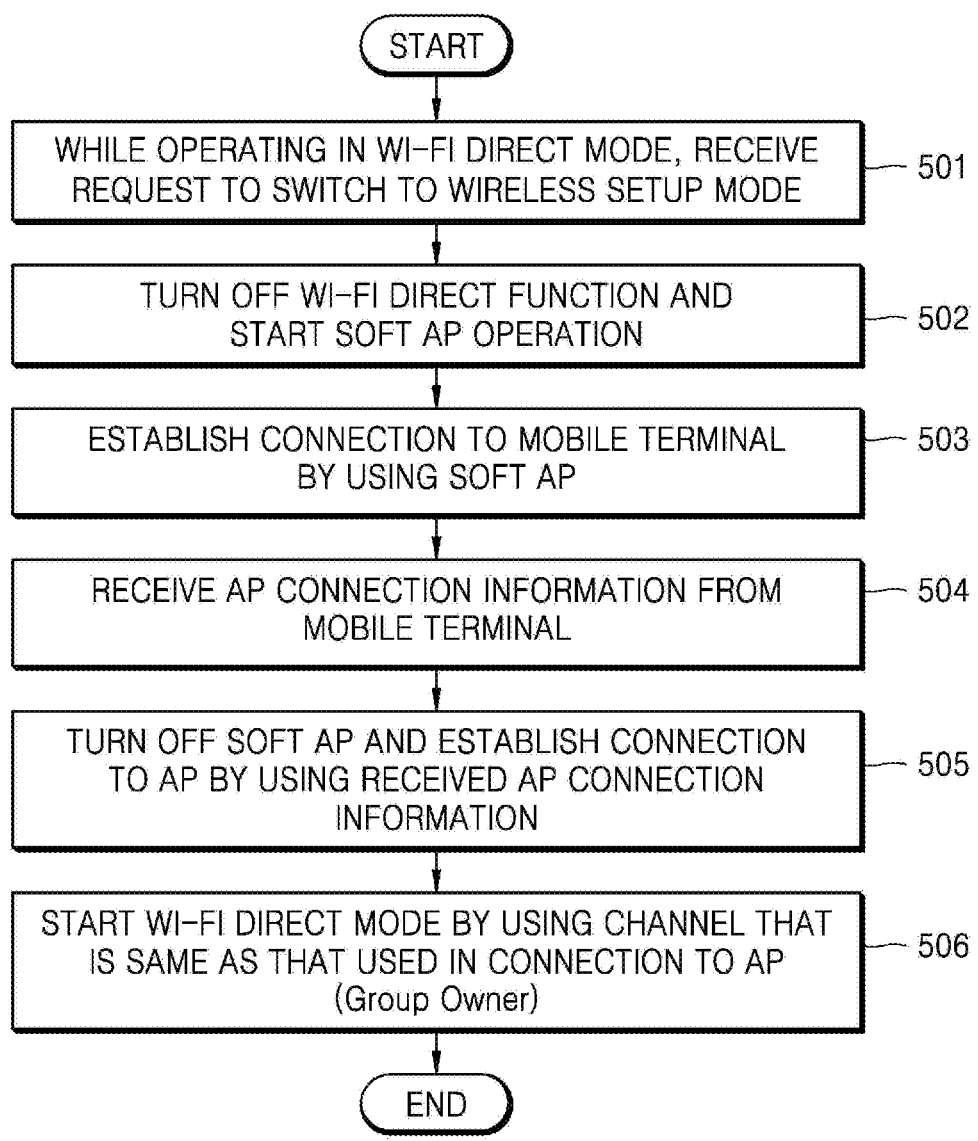
FIG. 5 is a flowchart illustrating operations that are performed in an image forming apparatus when a connection is made to an AP using a mobile terminal, according to an example.

FIG. 5 is a flowchart illustrating operations that are performed in an image forming apparatus when a connection is made to an AP using a mobile terminal, according to an example.

Referring to FIG. 5, in operation 501, while operating in a Wi-Fi Direct mode, an image forming apparatus receives a request to switch to a wireless setup mode from a user.

In operation 502, the image forming apparatus turns off a Wi-Fi Direct function and starts an operation of Soft AP.

In operation 503, the image forming apparatus is connected to a mobile terminal by using Soft AP.

In operation 504, the image forming apparatus receives AP connection information from the mobile terminal.

In operation 505, the image forming apparatus turns off Soft AP and establishes a connection to an AP by using the received AP connection information.

In operation 506, the image forming apparatus starts the Wi-Fi Direct mode by using the same channel as that used in connection to the AP and operates as a GO.

Unless under special circumstances, it is advantageous for the image forming apparatus 100 to basically maintain the Wi-Fi Direct mode because an external apparatus may attempt connection to the image forming apparatus 100 via Wi-Fi Direct at any time. Accordingly, when the image forming apparatus 100 is not connected to the mobile terminal 200 within a certain time period after entry into a wireless setup mode, or when the image forming apparatus 100 is connected to the mobile terminal 200 but does not receive AP connection information from the mobile terminal 200 within a certain time period, the image forming apparatus 100 may be automatically returned to the Wi-Fi Direct mode. Hereinafter, such an example will be described with reference to FIG. 6.

Figure 6:
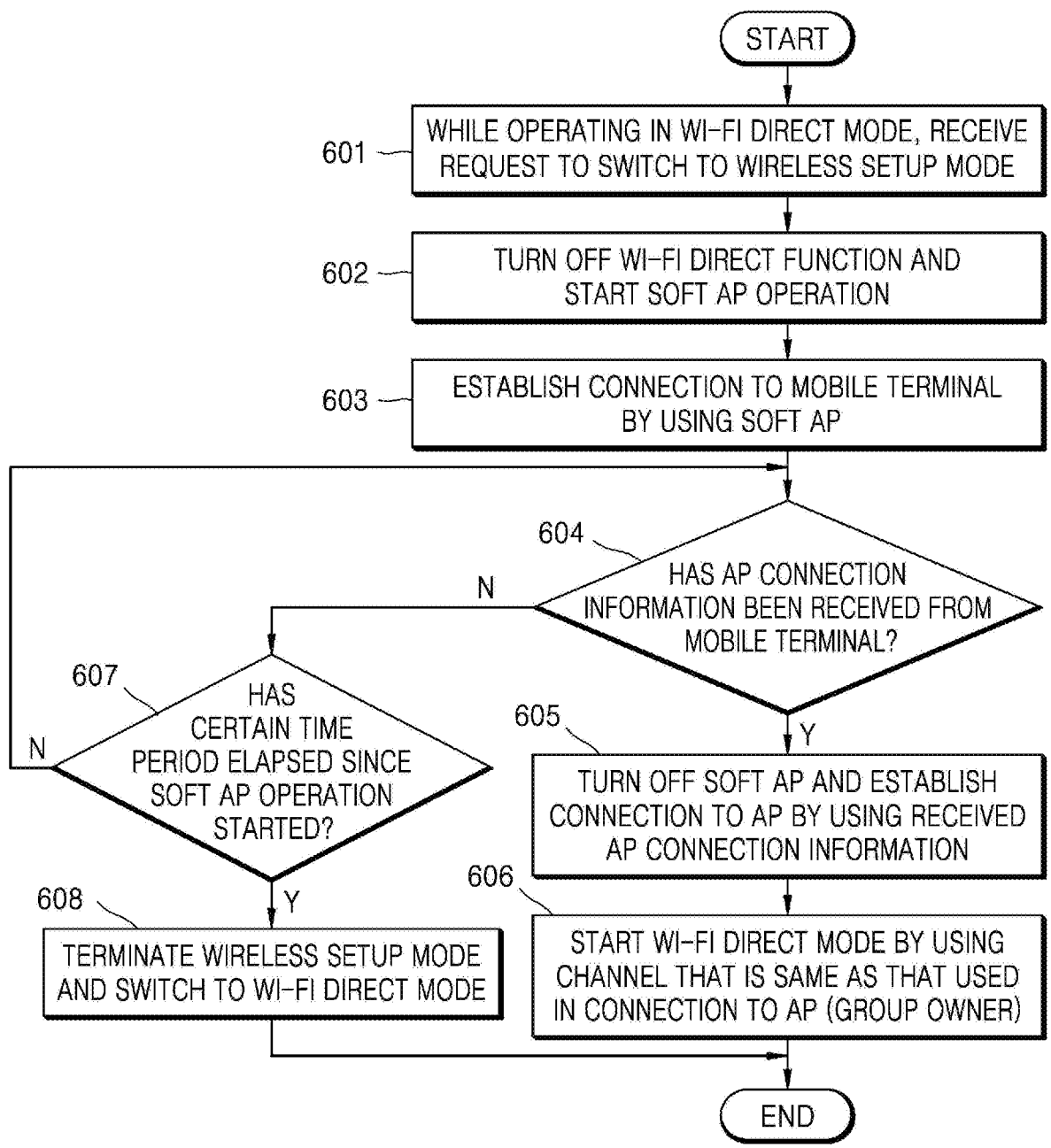
FIG. 6 is a flowchart illustrating operations that are performed in an image forming apparatus when a connection is made to an AP using a mobile terminal, according to an example.

FIG. 6 is a flowchart illustrating operations that are performed in an image forming apparatus when a connection is made to an AP using a mobile terminal, according to an example.

Referring to FIG. 6, in operation 601, while operating in a Wi-Fi Direct mode, an image forming apparatus receives a request to switch to a wireless setup mode from a user.

In operation 602, the image forming apparatus turns off a Wi-Fi Direct function and starts an operation of Soft AP.

In operation 603, the image forming apparatus is connected to a mobile terminal by using Soft AP.

In operation 604, the image forming apparatus determines whether AP connection information has been received from the mobile terminal.

As a result of the determination, when AP connection information has not been received from the mobile terminal, the image forming apparatus proceeds to operation 607 and determines whether a certain time period has elapsed since a Soft AP operation starts. That is, in operation 607, whether timeout of the wireless setup mode has elapsed is determined. When timeout of the wireless setup mode has elapsed, the image forming apparatus proceeds to operation 608 and terminates the wireless setup mode and switches to the Wi-Fi Direct mode. However, when timeout of the wireless setup mode is determined as not having elapsed, the image forming apparatus returns to operation 604.

As a result of determination of operation 604, when the image forming apparatus has received AP connection information from the mobile terminal, the image forming apparatus proceeds to operation 605 and turns off Soft AP and establishes a connection to an AP by using the received AP connection information.

In operation 606, the image forming apparatus starts the Wi-Fi Direct mode by using the same channel as that used in connection to the AP and operates as a GO.

As described above, when the image forming apparatus 100 releases connection to the mobile terminal 200 before attempting connection to the AP 10, the mobile terminal 200 may not receive a feedback regarding whether connection between the image forming apparatus 100 and the AP 10 has succeeded. To address such an issue, examples of maintaining a multi-channel for a certain time period will be described with reference to FIGS. 7 to 9.

Figure 7:
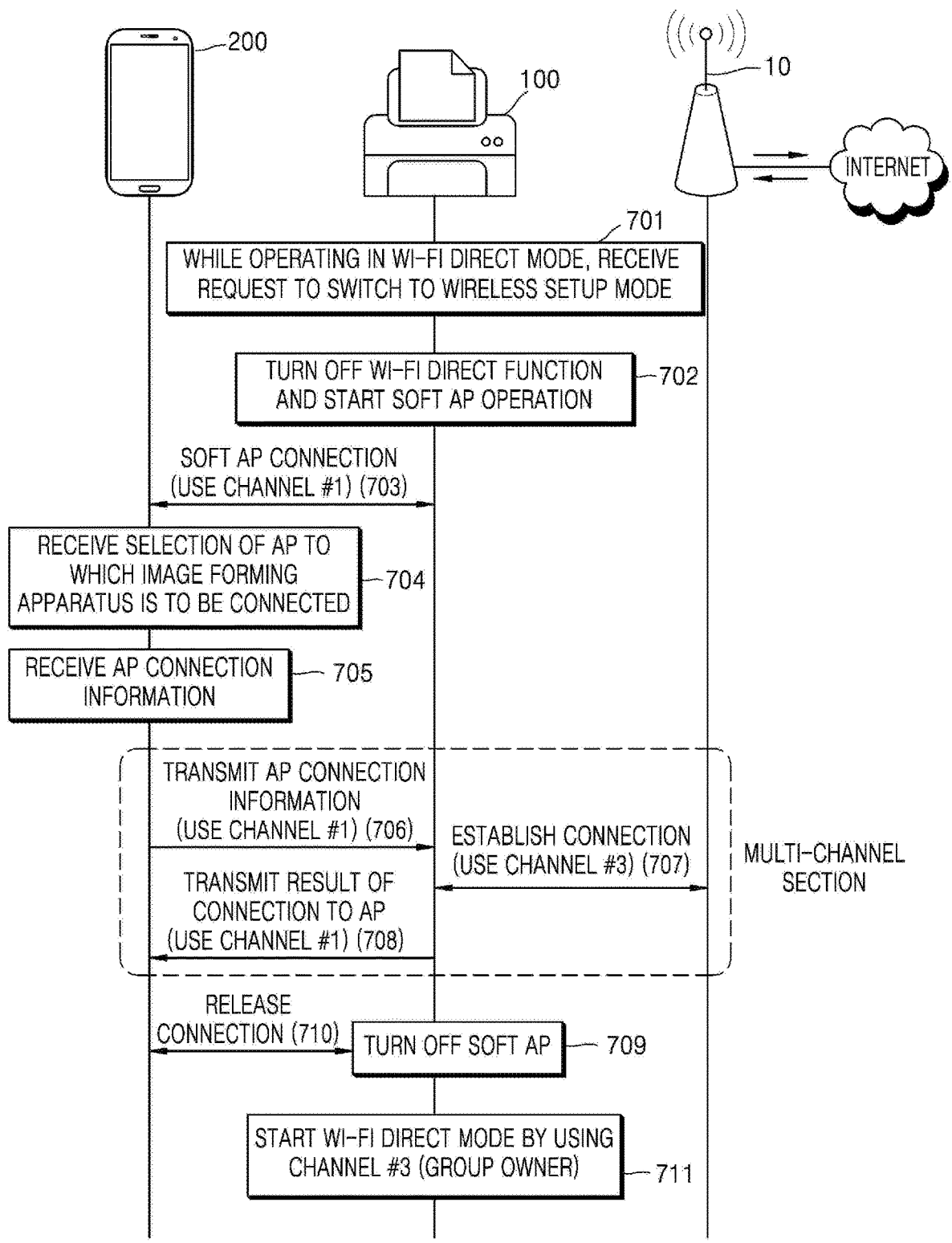
FIG. 7 is a diagram for explaining a method of connecting an image forming apparatus to an AP by using a mobile terminal, according to an example.

FIG. 7 is a diagram for explaining a method of connecting an image forming apparatus to an AP by using a mobile terminal, according to an example.

Referring to FIG. 7, since operations 701 to 705 are the same as operations 401 to 405 of FIG. 4 described above, a detailed description thereof is omitted below, and operation 706, etc. will be described hereinafter.

In operation 706, the mobile terminal 200 transmits AP connection information to the image forming apparatus 100, and in this regard, transmits the AP connection information via channel #1, which is a channel used in Soft AP connection.

In operation 707, the image forming apparatus 100 establishes a connection to the AP 10 by using the received AP connection information, and in this regard, a channel that is used in connection is determined by the AP 10. In FIG. 7, connection to the AP 10 is established by using channel #3.

A difference from the example of FIG. 4 is that, while maintaining Soft AP connection to the mobile terminal 200 using channel #1, the image forming apparatus 100 starts connection to the AP 10 by using channel #3. That is, the image forming apparatus 100 maintains wireless connection using two channels (channel #1 and channel #3) simultaneously. In the present example, a section where the image forming apparatus 100 maintains connection using two channels is referred to as a multi-channel section. Although communication efficiency decreases in the multi-channel section, the image forming apparatus 100 maintains the multi-channel section only for a certain time period to transmit a result of connection to the AP to the mobile terminal 200, and thus, it is not a significant problem.

In operation 708, the image forming apparatus 100 transmits a result of connection to the AP to the mobile terminal 200. In this regard, a channel for use is channel #1, which is a channel used in Soft AP connection to the mobile terminal 200.

Although not illustrated, the mobile terminal 200 may display the received result of connection to the AP on a screen thereof. Accordingly, a user may determine whether wireless connection between the image forming apparatus 100 and the AP 10 is a success via the screen of the mobile terminal 200.

In addition, when connection to the AP 10 fails due to wrong AP connection information (e.g. a password mismatch), the mobile terminal 200 may display a screen for guiding connection failure and may subsequently display a screen for receiving an input of AP connection information again. When the mobile terminal 200 receives AP connection information from the user again, the mobile terminal 200 may transmit the AP connection information to the image forming apparatus 100 again, and the image forming apparatus 100 may reattempt connection to the AP 10 by using new AP connection information.

Referring to FIG. 7 again, in operation 709, the image forming apparatus 100 turns off Soft AP, and, in operation 710, connection to the mobile terminal 200 is released.

In operation 711, the image forming apparatus 100 starts a Wi-Fi Direct mode by using channel #3 used in connection to the AP 10 and operates as a GO.

Figure 8:
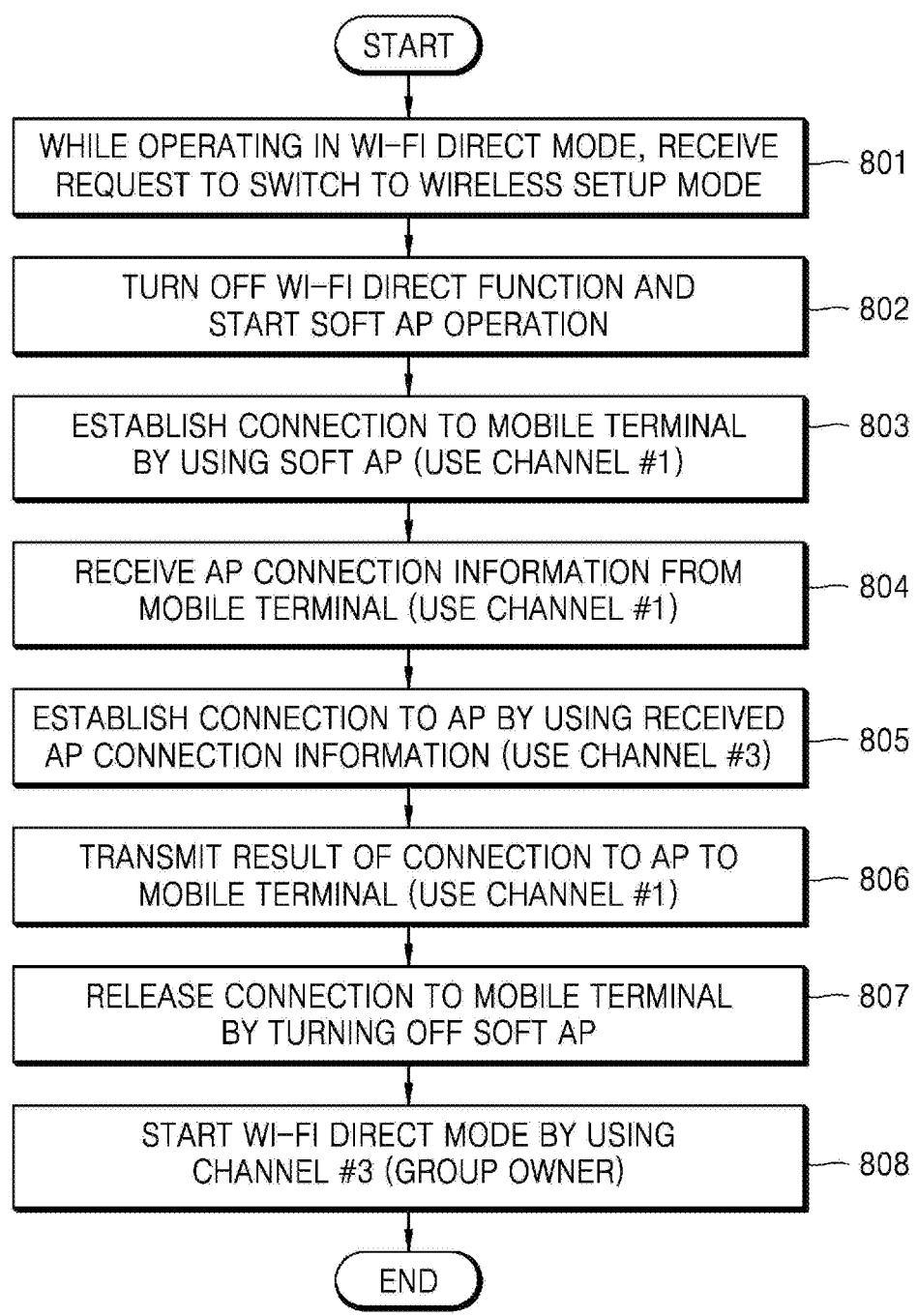
FIG. 8 is a flowchart illustrating operations that are performed in an image forming apparatus when a connection is made to an AP using a mobile terminal, according to an example.

FIG. 8 is a flowchart illustrating operations that are performed in an image forming apparatus when a connection is made to an AP using a mobile terminal, according to an example.

Referring to FIG. 8, in operation 801, while operating in a Wi-Fi Direct mode, an image forming apparatus receives a request to switch to a wireless setup mode from a user.

In operation 802, the image forming apparatus turns off a Wi-Fi Direct function and starts an operation of Soft AP.

In operation 803, the image forming apparatus is connected to a mobile terminal by using Soft AP. In this regard, a channel that is used in Soft AP connection between the image forming apparatus and the mobile terminal is assumed to be channel #1.

In operation 804, the image forming apparatus receives AP connection information from the mobile terminal.

In operation 805, the image forming apparatus establishes a connection to an AP by using the received AP connection information. In this regard, a channel that is used in connection between the image forming apparatus and the AP is determined by the AP. In the present example, use of channel #3 is assumed.

In operation 806, the image forming apparatus is maintaining Soft AP connection using channel #1 and transmits a result of connection to the AP to the mobile terminal.

In operation 807, the image forming apparatus releases connection to the mobile terminal by turning off Soft AP. That is, the image forming apparatus releases connection via channel #1.

In operation 808, the image forming apparatus starts the Wi-Fi Direct mode by using channel #3 used in connection to the AP and operates as a GO.

Figure 9:
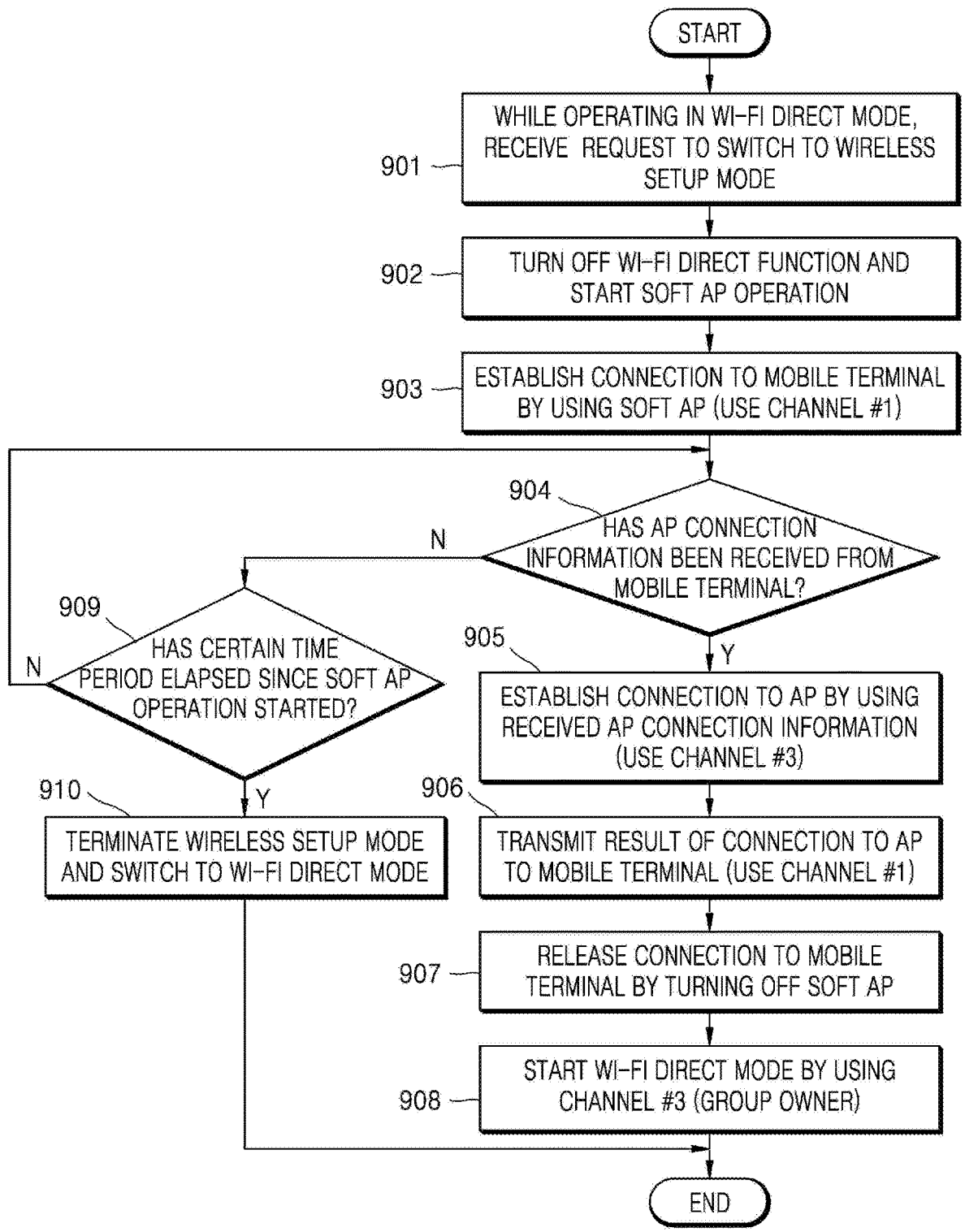
FIG. 9 is a flowchart illustrating an example in which a method of maintaining multiple channels during a certain time period and a method of automatically switching to a Wi-Fi Direct mode when AP connection information is not received from a mobile terminal within a certain time period after entry into a wireless setup mode are combined.

FIG. 9 is a flowchart illustrating an example in which a method of maintaining multiple channels during a certain time period and a method of automatically switching to a Wi-Fi Direct mode when AP connection information is not received from a mobile terminal within a certain time period after entry into a wireless setup mode are combined.

Referring to FIG. 9, operations 901 to 903 are the same as operations 801 to 803 of FIG. 8, and thus, a detailed description thereof is omitted below.

In operation 904, an image forming apparatus determines whether AP connection information has been received from a mobile terminal.

As a result of the determination, when AP connection information has not been received from the mobile terminal, the image forming apparatus proceeds to operation 909 and determines whether a certain time period has elapsed since a Soft AP operation starts. That is, in operation 909, whether timeout of a wireless setup mode has elapsed is determined. When timeout of the wireless setup mode has elapsed, the image forming apparatus terminates the wireless setup mode and switches to a Wi-Fi Direct mode in operation 910. However, when timeout of the wireless setup mode is determined as not having elapsed yet, the image forming apparatus returns to operation 904.

As a result of determination of operation 904, when the image forming apparatus has received AP connection information from the mobile terminal, the image forming apparatus proceeds to operation 905 and establishes a connection to an AP by using the received AP connection information. In this regard, a channel that is used in connection between the image forming apparatus and the AP is determined by the AP, and in the present example, use of channel #3 is assumed.

In operation 906, the image forming apparatus is maintaining Soft AP connection using channel #1 and transmits a result of connection to the AP to the mobile terminal.

In operation 907, the image forming apparatus releases connection to the mobile terminal by turning off Soft AP. That is, the image forming apparatus releases connection via channel #1.

In operation 908, the image forming apparatus starts the Wi-Fi Direct mode by using channel #3 used in connection to the AP and operates as a GO.

When the mobile terminal 200 supports Wi-Fi Direct, the image forming apparatus 100 may be connected to the mobile terminal 200 via Wi-Fi Direct and receive AP connection information. An example of using the mobile terminal 200 supporting Wi-Fi Direct will be described below with reference to FIGS. 10 and 11.

Figure 10:
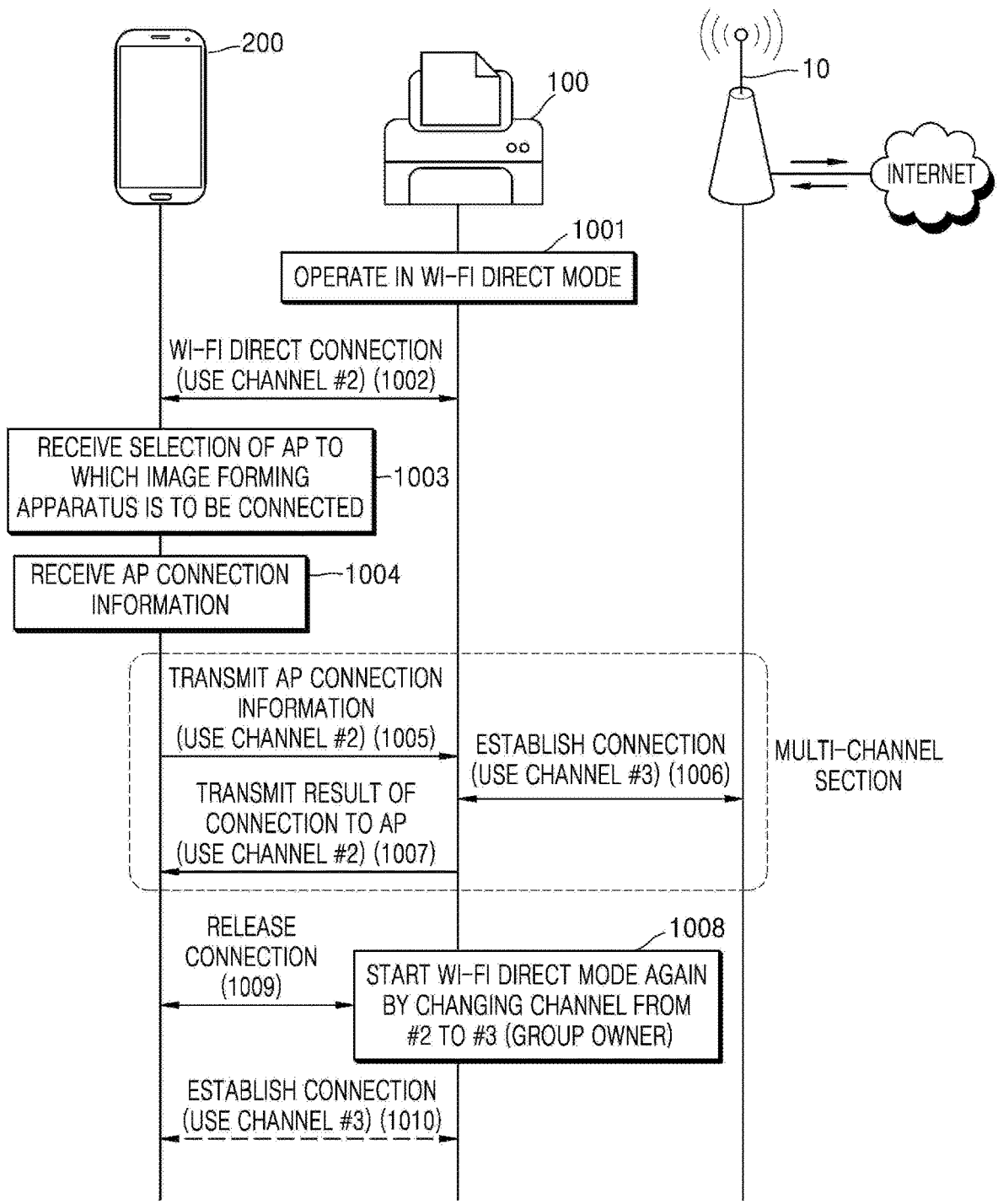
FIG. 10 is a diagram for explaining a method of connecting an image forming apparatus to an AP by using a mobile terminal that supports Wi-Fi Direct, according to an example.

FIG. 10 is a diagram for explaining a method of connecting an image forming apparatus to an AP by using a mobile terminal that supports Wi-Fi Direct, according to an example.

Referring to FIG. 10, in operation 1001, the image forming apparatus 100 starts an operation as a Wi-Fi Direct mode. In this regard, the image forming apparatus 100 operates as a GO and thus may select a channel that is to be used in Wi-Fi Direct connection, and in the present example, selection of channel #2 is assumed.

In operation 1002, the image forming apparatus establishes a Wi-Fi Direct connection to the mobile terminal 200. In this regard, channel #2 is used in Wi-Fi Direct connection.

In operation 1003, the mobile terminal 200 receives an input from a user of selecting an AP to which the image forming apparatus is to be connected. The user may search for connectable APs on the mobile terminal 200, and when found APs are displayed on a screen of the mobile terminal 200, the user may select, from among the found APs, an AP that is to be connected to the image forming apparatus 100.

In operation 1004, the mobile terminal 200 may receive an input of AP connection information from the user.

In operation 1005, the mobile terminal 200 transmits the AP connection information to the image forming apparatus 100 via Wi-Fi Direct connection using channel #2.

In operation 1006, the image forming apparatus 100 establishes a connection to the AP 10 by using the received AP connection information, and in this regard, a channel that is used in connection is determined by the AP 10. In FIG. 10, connection to the AP 10 is established by using channel #3.

While maintaining Wi-Fi Direct connection to the mobile terminal 200 by using channel #2, the image forming apparatus 100 starts connection to the AP 10 by using channel #3. That is, the image forming apparatus 100 maintains wireless connection using two channels (channel #2 and channel #3) simultaneously during a multi-channel section.

In operation 1007, the image forming apparatus 100 transmits a result of connection to the AP to the mobile terminal 200. In this regard, a channel for use is channel #2, which is a channel used in Wi-Fi Direct connection to the mobile terminal 200.

In operation 1008, the image forming apparatus 100 changes the channel and starts a Wi-Fi Direct mode again. A channel (channel #3) that is used in connection of the AP 10 is determined by the AP 10. The image forming apparatus 100 may select a channel to use when starting a Wi-Fi Direct mode again as a GO. Accordingly, the image forming apparatus 100 may terminate the Wi-Fi Direct mode using channel #2 and may start a Wi-Fi Direct mode again to use channel #3.

During a process in which the image forming apparatus 100 starts a Wi-Fi Direct mode again, connection to the mobile terminal 200 is released in operation 1009.

After the image forming apparatus 100 newly starts a Wi-Fi Direct mode, in operation 1010, the mobile terminal 200 may be Wi-Fi Direct connected to the image forming apparatus 100 again. In this regard, channel #3 is used in Wi-Fi Direct connection.

Figure 11:
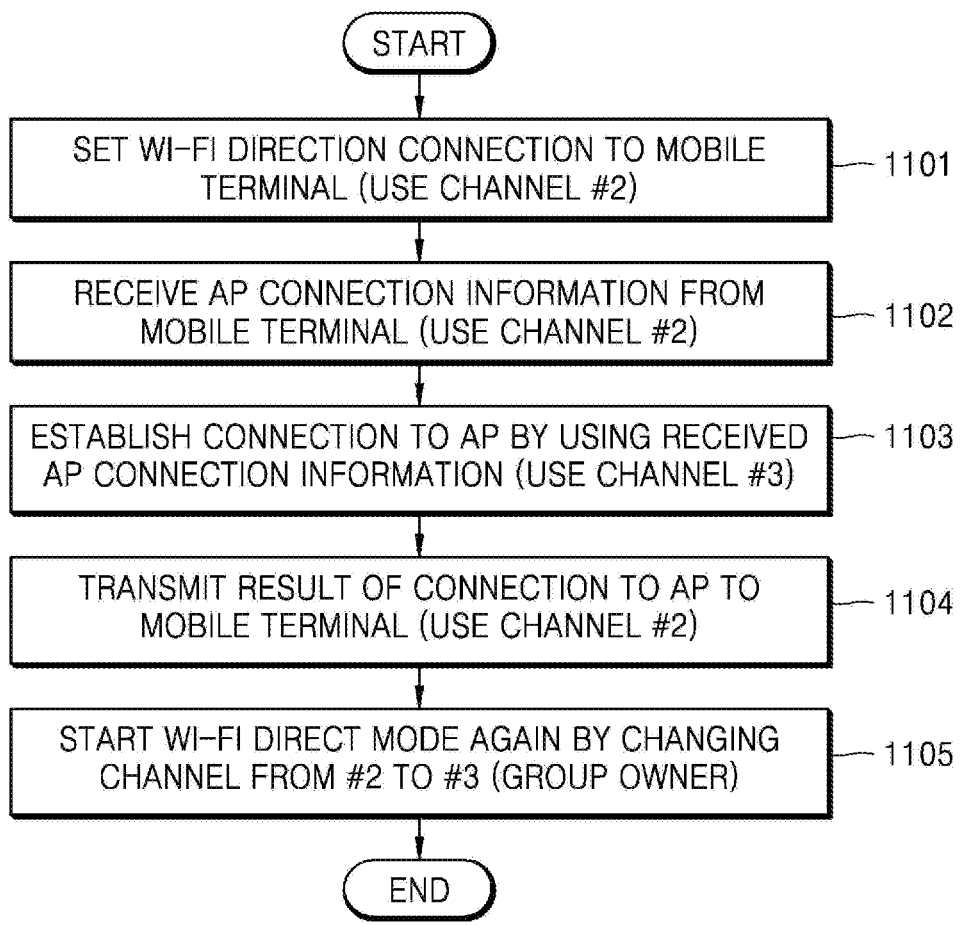
FIG. 11 is a flowchart illustrating operations that are performed in an image forming apparatus when a connection is made to an AP using a mobile terminal that supports Wi-Fi Direct, according to an example.

FIG. 11 is a flowchart illustrating operations that are performed in an image forming apparatus when a connection is made to an AP using a mobile terminal that supports Wi-Fi Direct, according to an example.

Referring to FIG. 11, in operation 1101, an image forming apparatus establishes a Wi-Fi Direct connection to a mobile terminal. In this regard, a channel that is used in the Wi-Fi Direct connection is assumed to be channel #2.

In operation 1102, the image forming apparatus receives AP connection information from the mobile terminal via Wi-Fi Direct connection by use of channel #2.

In operation 1103, the image forming apparatus establishes a connection to an AP by using the received AP connection information. In this regard, a channel that is used in connection between the image forming apparatus and the AP is determined by the AP, and in the present example, use of channel #3 is assumed.

In operation 1104, the image forming apparatus is maintaining Wi-Fi Direct connection using channel #2 and transmits a result of connection to the AP to the mobile terminal.

In operation 1105, the image forming apparatus starts a Wi-Fi Direct mode again by changing the channel from #2 to #3 and operates as a GO. That is, the image forming apparatus terminates an existing Wi-Fi Direct mode using channel #2 and newly starts a Wi-Fi Direct mode using channel #3.

The examples described above may be embodied in the form of a non-transitory computer-readable recording medium storing instructions executable by a computer and data. At least one of the instructions and the data may be stored in the form of program codes, and when executed by a processor, may generate a predetermined program module and perform a predetermined operation.

The non-transitory computer-readable recording medium may refer to, for example, a magnetic storage medium such as hard disk, an optical storage medium such as compact disc (CD) or digital versatile disc (DVD), etc., and in some examples, may refer to a memory included in a server accessible via a network. For example, the computer-readable recording medium may be at least one of the memory 140 of the image forming apparatus 100, a memory of the input/output interface 110, or may be the memory 240 included in the external apparatus 200 connected to the image forming apparatus 100 via a network.

While one or more examples have been described with reference to the figures, it will be understood by those of ordinary skill in the art that various changes in form and details may be made therein without departing from the spirit and scope of the inventive concept as defined by the following claims.

What is claimed is:

1. A wireless connection establishment method of an image forming apparatus using a mobile terminal, the wireless connection establishment method comprising:
   while the image forming apparatus operates in a wireless fidelity (Wi-Fi) Direct communication mode, receiving a request to switch to a wireless setup communication mode;
   terminating the Wi-Fi Direct communication mode;
   wirelessly connecting to the mobile terminal by entering the wireless setup communication mode;
   receiving access point (AP) connection information from the mobile terminal using the wireless setup communication mode;
   establishing a connection to an AP by using the received AP connection information; and
   starting a new Wi-Fi Direct communication mode.

2. The wireless connection establishment method of claim 1, wherein the wirelessly connecting to the mobile terminal by entering the wireless setup communication mode comprises:
   turning off a Wi-Fi Direct function and operating Soft AP; and
   connecting to the mobile terminal by using the Soft AP.

3. The wireless connection establishment method of claim 2, wherein the establishing of the connection to the AP comprises:
   terminating the Soft AP; and
   requesting connection while transmitting the AP connection information to the AP.

4. The wireless connection establishment method of claim 2, wherein the establishing of the connection to the AP comprises:
   while maintaining connection to the mobile terminal by using the Soft AP, transmitting the AP connection information to the AP and requesting connection;
   transmitting, to the mobile terminal, a result of the connection to the AP; and
   terminating the Soft AP.

5. The wireless connection establishment method of claim 1, wherein the starting of the new Wi-Fi Direct communication mode comprises:
   starting the new Wi-Fi Direct communication mode using a channel that is the same as that used in the connection to the AP.

6. The wireless connection establishment method of claim 1, wherein the AP connection information comprises credential information for accessing the AP.

7. The wireless connection establishment method of claim 1, wherein, when there is no connection to the mobile terminal within a certain time period after the entry into the wireless setup communication mode or the AP connection information is not received in spite of there being a connection to the mobile terminal, the image forming apparatus terminates the wireless setup communication mode and starts the new Wi-Fi Direct communication mode.

8. An image forming apparatus comprising:
an input/output interface to receive a user input;
a communicator to perform communication with a mobile terminal; and
a controller,
wherein, when the image forming apparatus receives a request to switch to a wireless setup communication mode via the input/output interface while operating in a wireless fidelity (Wi-Fi) Direct communication mode, the controller is to:
terminate the Wi-Fi Direct communication mode and wirelessly connect to the mobile terminal by entering the wireless setup communication mode, and
when access point (AP) connection information is received from the mobile terminal, establish a connection to an AP by using the received AP connection information and start a new Wi-Fi Direct communication mode.

9. The image forming apparatus of claim 8, wherein, when the image forming apparatus enters the wireless setup communication mode, the controller is to turn off a Wi-Fi Direct function and operate Soft AP.

10. The image forming apparatus of claim 9, wherein the controller is to terminate the Soft AP to establish the connection to the AP and request connection while transmitting the AP connection information to the AP.

11. The image forming apparatus of claim 9, wherein the controller is to:
while maintaining connection to the mobile terminal by using the Soft AP to establish the connection to the AP, transmit the AP connection information to the AP and request connection, and
transmit a result of the connection to the AP to the mobile terminal and terminate the Soft AP.

12. The image forming apparatus of claim 8, wherein the controller is to start the new Wi-Fi Direct communication mode by using a channel that is the same as that used in the connection to the AP.

13. The image forming apparatus of claim 8, wherein the AP connection information comprises credential information for accessing the AP.

14. The image forming apparatus of claim 8, wherein, when there is no connection to the mobile terminal within a certain time period after the entry into the wireless setup communication mode or the AP connection information is not received in spite of there being a connection to the mobile terminal, the controller is to terminate the wireless setup communication mode and start the new Wi-Fi Direct communication mode.

15. A non-transitory computer-readable recording medium having instructions recorded thereon for performing a wireless connection establishment method of an image forming apparatus using a mobile terminal, the non-transitory computer-readable recording medium comprising:
instructions for, while the image forming apparatus operates in a wireless fidelity (Wi-Fi) Direct communication mode, receiving a request to switch to a wireless setup communication mode;
instructions for terminating the Wi-Fi Direct communication mode and wirelessly connecting to the mobile terminal by entering the wireless setup communication mode;
instructions for receiving access point (AP) connection information from the mobile terminal;
instructions for establishing a connection to an AP by using the received AP connection information; and
instructions for starting a new Wi-Fi Direct communication mode.

* * * * *